United States Patent
Zhang et al.

(10) Patent No.: US 11,290,918 B2
(45) Date of Patent: Mar. 29, 2022

(54) METHOD AND APPARATUS FOR TRANSMITTING CONTROL CHANNEL AND DATA CHANNEL IN V2X COMMUNICATION

(71) Applicant: SAMSUNG ELECTRONICS CO., LTD., Suwon-si (KR)

(72) Inventors: Shichang Zhang, Beijing (CN); Yi Wang, Beijing (CN); Yingyang Li, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/080,209

(22) PCT Filed: Apr. 3, 2017

(86) PCT No.: PCT/KR2017/003641
§ 371 (c)(1),
(2) Date: Aug. 27, 2018

(87) PCT Pub. No.: WO2017/171519
PCT Pub. Date: Oct. 5, 2017

(65) Prior Publication Data
US 2019/0069200 A1 Feb. 28, 2019

(30) Foreign Application Priority Data

| Apr. 1, 2016 | (CN) | 201610204488.9 |
| May 12, 2016 | (CN) | 201610316848.4 |
| Aug. 8, 2016 | (CN) | 201610643989.7 |

(51) Int. Cl.
*H04W 28/16* (2009.01)
*H04W 72/04* (2009.01)
(Continued)

(52) U.S. Cl.
CPC .......... *H04W 28/16* (2013.01); *H04L 5/0044* (2013.01); *H04L 5/0053* (2013.01);
(Continued)

(58) Field of Classification Search
CPC combination set(s) only.
See application file for complete search history.

(56) References Cited

U.S. PATENT DOCUMENTS

| 2016/0066337 A1 | 3/2016 | Sartori et al. |
| 2016/0295624 A1* | 10/2016 | Novlan ................. H04W 76/14 |

(Continued)

FOREIGN PATENT DOCUMENTS

WO 2015/170871 A1 11/2015

OTHER PUBLICATIONS

ZTE, "Resource pool allocation enhancement for V2V", R1-160682, 3GPP TSG-RAN WG1 Meeting #84, St Julian's, Malta, Feb. 15-19, 2016 (8 pages total).
(Continued)

*Primary Examiner* — Yee F Lam
(74) *Attorney, Agent, or Firm* — Sughrue Mion, PLLC

(57) ABSTRACT

The application provides a method for transmitting a control channel and a data channel in V2X communication, comprising the following steps of: first, determining, by a UE, resource pool configurations for a PSCCH and a PSSCH and an association relationship between the both; then, determining, by the UE and in PSCCH resource pools or a subset of PSCCH resource pools, PSCCH resources required by one or multiple times of PSCCH transmission, and further determining, in PSSCH resource pools associated with the PSCCH resource pools or in a subset of PSSCH resource pools associated with the subset of PSCCH resource pools, time-frequency domain resources for PSSCH transmission; and finally, transmitting, by the UE, corresponding infor-
(Continued)

mation on the determined PSCCH and PSSCH resources. By the method provided by the present application, the requirement on low time delay of V2X services can be met, and the implementation complexity of a UE can be effectively controlled.

12 Claims, 7 Drawing Sheets

(51) Int. Cl.
  *H04W 4/20* (2018.01)
  *H04W 72/02* (2009.01)
  *H04W 4/40* (2018.01)
  *H04L 5/00* (2006.01)
(52) U.S. Cl.
  CPC ............ *H04L 5/0094* (2013.01); *H04W 4/20* (2013.01); *H04W 72/02* (2013.01); *H04W 72/0426* (2013.01); *H04W 4/40* (2018.02)

(56) References Cited

U.S. PATENT DOCUMENTS

| | | | |
|---|---|---|---|
| 2017/0048822 A1 | 2/2017 | Lee et al. | |
| 2017/0127413 A1* | 5/2017 | Guan | H04W 72/0446 |
| 2017/0289733 A1* | 10/2017 | Rajagopal | H04W 4/70 |
| 2017/0374677 A1* | 12/2017 | Lee | H04W 12/08 |
| 2018/0115960 A1* | 4/2018 | Sorrentino | H04W 72/042 |
| 2018/0115970 A1* | 4/2018 | Chae | H04W 72/02 |
| 2018/0132254 A1* | 5/2018 | Chae | H04W 72/02 |
| 2018/0206140 A1* | 7/2018 | Panteleev | H04W 76/14 |
| 2018/0213379 A1* | 7/2018 | Xiong | H04W 88/04 |
| 2018/0227882 A1* | 8/2018 | Freda | H04W 8/005 |
| 2018/0234888 A1* | 8/2018 | Yasukawa | H04W 28/26 |
| 2019/0029029 A1* | 1/2019 | Ohtsuji | H04W 4/023 |
| 2019/0075548 A1* | 3/2019 | Lee | H04W 72/044 |
| 2019/0090250 A1* | 3/2019 | Lee | H04W 72/02 |
| 2019/0132818 A1* | 5/2019 | Yasukawa | H04W 72/02 |
| 2019/0208441 A1* | 7/2019 | Wang | H04B 17/318 |
| 2019/0208504 A1* | 7/2019 | Yasukawa | H04W 74/0816 |
| 2020/0169984 A1* | 5/2020 | Lee | H04L 1/1819 |
| 2020/0296690 A1* | 9/2020 | Lee | H04W 4/40 |
| 2020/0296731 A1* | 9/2020 | Chae | H04W 72/0486 |

OTHER PUBLICATIONS

Samsung, "Scheduling assignment options for V2V communication", R1-160576, 3GPP TSG RAN WG1 #84, St Julian's, Malta, Feb. 15-19, 2016 (7 pages total).
Huawei et al., "Resource pool design", R1-160283, 3GPP TSG RAN WG1 Meeting #84, St Julian's, Malta, Feb. 15-19, 2016 (7 pages total).
International Search Report (PCT/ISA/210), issued by International Searching Authority in corresponding International Application No. PCT/KR2017/003641, dated Jul. 13, 2017.
Written Opinion (PCT/ISA/237) issued by the International Searching Authority in corresponding International Application No. PCT/KR2017/003641, dated Jul. 13, 2017.

* cited by examiner

METHOD AND APPARATUS FOR TRANSMITTING CONTROL CHANNEL AND DATA CHANNEL IN V2X COMMUNICATION

TECHNICAL FIELD

The present application relates to the technical field of mobile communications, and in particular to a method and apparatus for transmitting a control channel and a data channel in V2X communication.

BACKGROUND ART

At present, due to its great potential value in the public security field and the ordinary civil communication field, the Device to Device (D2D) communication technology has been accepted by the 3GPP standards, and has realized the standardization of a part of functions in the 3GPP Rel-12, including the mutual discovery of D2D terminals in a In Coverage (IC) scenario, and the broadcast communications between D2D terminals in a In Coverage (IC) scenario, a Partial Coverage (PC) scenario and an Out of Coverage (OC) scenario.

At present, two D2D broadcast communication modes (Mode 1 and Mode 2 for short) have been defined in the 3GPP Rel-12. Wherein, Mode 1 requires that a UE transmitting D2D broadcast communication must be a UE in coverage of a cellular network (ICUE). The UE acquires configuration information of a Physical Sidelink Control Channel (PSCCH) resource pool of Mode 1 by receiving a system broadcast signaling transmitted by an eNB, the configuration information containing the period of the PSCCH and the position of a subframe for transmitting the PSCCH in each period, as well as the position of a Physical Resource Block (PRB) for PSCCH transmission in each subframe. When a UE supporting the Mode 1 broadcast communication has data, the UE applies for a dedicated Mode 1 communication resource from the eNB by a particular Buffer Status Report (BSR). Subsequently, the UE detects a sidelink grant from the eNB before each PSCCH period, and acquires the position of a resource for transmitting the PSCCH and the Physical Sidelink Shared Channel (PSSCH) in this PSCCH period. In Mode 1, collision of resources between different UEs can be avoided through the centralized control by the eNB.

A UE transmitting a D2D broadcast communication in Mode 2 can be an ICUE, or a UE out of coverage of the cellular network (OCUE). The ICUE acquires configurations of a PSCCH resource pool and an associated PSSCH resource pool for the Mode 2 by receiving a system broadcast signaling from the eNB (where the PSSCH resource pool contains the positions of subframes for PSSCH transmission in the associated PSCCH period, as well as the position of a physical resource block for PSSCH transmission in each subframe), and then randomly selects resources for transmitting the PSCCH and the associated PSSCH in each PSCCH period; while the OCUE determines configurations of a PSCCH resource pool and an associated PSSCH resource pool for the Mode 2 through pre-configuration information, and the way of selecting resources is the same as that for the ICUE. In a PC scenario, the Mode 2 resource pool configuration preconfigured by the OCUE is related to a carrier frequency of a cell of an ICUE participating in the D2D broadcast communication, a system bandwidth and/or a TDD configuration.

In the two D2D broadcast communication modes, PSCCH resource pools are bound with PSSCH resource pools or PSSCH resources one by one. Within each PSCCH period, the position of a PSCCH resource pool is prior to the associated PSSCH resource pool or PSSCH resources, and the resources in the both pools are not overlapped. In addition, since D2D terminals operate in a half-duplex mode, terminals performing simultaneous transmission cannot receive signals transmitted by the opposite party. In the Rel-12, the half-duplex limitation is solved in a resource hopping manner.

Within each PSCCH period, each PSCCH will be transmitted for two times, and the time-frequency domain resource for the first transmission is:

$n_{t_1} = \mod(s, N_t)$,
$n_{f_1} = \text{floor}(s/N_t)$;

the resource for the second transmission is:

$n_{t_2} = \mod(s + \mod(n_{f_1}, N_s) + 1, N_t)$,
$n_{f_2} = \text{floor}(N_f/2) + n_{f_1}$;

where s is an index of a PSCCH resource, the PSCCH resource is one or more PRBs for one PSCCH transmission, $N_t$ is the number of subframes contained in the PSCCH resource pool, $N_f$ is the number of PRBs contained in the PSCCH resource pool, and $N_s = N_f - 1$. In this resource hopping way, PSCCHs transmitted on a same subframe for the first time, the offset generated by the positions of subframes of the resource for the second transmission, and the amplitude of the offset are all related to the frequency domain position of the resource for the first transmission, so that it is ensured that positions of subframes for PSCCH retransmission on a same subframe during the first transmission are different. In addition, two times of transmission can ensure the receiving reliability of PSCCHs.

A PSSCH scheduled by the PSCCH will be transmitted for four times, and the positions of subframes for the four times of transmission are determined by a Time Resource Pattern (TRP). An index of the TRP used by the PSSCH transmission is indicated by the PSCCH, and a receiving terminal determines a mapping relation between TRP indexes and TRPs by receiving a cell signaling or by pre-configuration. The TRP is represented by a bit sequence having a length of $N_{TRP}$. If the set of subframes for PSSCH transmission within a PSCCH period is $\{l_0, l_1, l_2, \ldots, l_{L_{Data}-1}\}$ and the TRP pattern associated with the TRP index indicated in this PSCCH is $\{b_0, b_1, b_2, \ldots, b_{N_{TRP}-1}\}$, and if $b_{j \mod N_{TRP}} = 1$, subframe $l_j$ is used for transmitting a PSSCH scheduled by the PSCCH. Since the positions of subframes associated with different TRPs are not completely identical, terminals that transmit PSSCHs by using different TRPs are likely to receive PSSCHs from the opposite party. In addition, similar to the PSCCH, four times of transmission can ensure the bit error rate of receiving PSSCHs on the receiving side.

It can be seen from the above description that, to solve the half-duplex limitation and ensure the requirement on receiving reliability, the resources for transmitting PSCCHs and the resources for transmitting PSSCHs are not overlapped, and, the resources for transmitting PSCCHs are located prior to the resources being scheduled for transmitting PSSCHs and the used resource hopping way is different from that for PSSCH transmission. Such a design facilitates the simplification of the receiving complexity on the receiving side. However, it increases the time delay of PSSCH transmission.

Since the standardized D2D communication in the 3GPP Rel-12 is mainly specific to low-speed terminals, as well as services having lower requirements on the time delay sensitivity and receiving reliability, the realized D2D functions are far unable to meet the user demands. Accordingly, in the subsequent 3GPP versions, further enhancing the functional framework of D2D has become a broad consensus for various communication terminal manufacturers and communication network equipment manufacturers nowadays. Wherein, based on the current D2D broadcast communication mechanism, supporting low-delay and high-reliability direct communications between high-speed equipments, between a high-speed equipment and a low-speed equipment and between a high-speed equipment and a static equipment (i.e., V2X (Vehicle to Vehicle/Pedestrian/Infrastructure/Network) is one of functions to be standardized preferentially.

Compared to the existing D2D communication, the major difference between the V2X communication and the D2D communication lies in the higher requirements on the time delay and reliability. At present, the 3GPP has clearly stipulated that the minimum time delay for the V2X is 20 ms, and has also provided requirements on high reliability. However, in the existing D2D design process, the requirements on the two aspects have not yet been used as main consideration factors. For example, in an existing D2D communication mechanism, the maximum absolute time occupied by the PSCCH resource pool can reach 400 ms. However, since the position of the data resource is always behind the PSCCH resource pool, it is difficult to ensure the transmission delay of data in the existing D2D communication. In addition, a PSCCH is transmitted for two times at present. However, for a multiple of terminals transmitting PSCCHs, if the first transmission or the second transmission is conducted on a same subframe, the terminals have only one opportunity to receive PSCCHs from the opposite party at most, so that the receiving reliability of PSCCHs will be seriously influenced. Moreover, since a PSCCH is likely to schedule multiple times of PSSCH transmission within each PSCCH period at present, the receiving reliability of PSSCHs will be further reduced, when compared with the receiving reliability of PSCCHs.

It can be seen from the above analysis that the existing D2D communication mechanism has great deficiencies in term of data transmission delay and data transmission reliability and cannot meet the requirements on the low time delay and high reliability in the V2X communication. However, there has been no ideal technical solution on how to solve the problems.

DISCLOSURE OF INVENTION

Technical Problem

An objective of the present application is to solve at least one of the technical defects described above, and particularly to provide a method and apparatus for transmitting a PSCCH and a PSSCH in V2X communication.

Solution to Problem

The method comprises the following steps of:
first, determining, by a UE, a set of resources available for PSCCH transmission and a set of PSSCH resources associated with the set of PSCCH resources;
determining, by the UE and in the set of PSCCH resources, a PSCCH resource required by PSCCH transmission;
determining, by the UE and in the set of PSSCH resources associated with the set of PSCCH resources, a time-frequency domain resource for PSSCH transmission; and
transmitting, by the UE, corresponding information on the determined PSCCH and PSSCH resources.

Preferably, the determining a set of resources for PSCCH transmission and a set of resources for PSSCH transmission associated with the set of resources for PSCCH transmission comprises: the set of resources for PSCCH transmission is all resources in PSCCH resource pools, and the set of resources for PSSCH transmission is all resources in PSSCH resource pools.

Or, the set of resources for PSCCH transmission is a subset of PSCCH resource pools, and the set of associated resources for PSSCH transmission is a subset of PSSCH resource pools; and, subframes contained in the subset of PSCCH resource pools are completely identical with subframes contained in the subset of PSSCH resource pools, and positions of PRBs are not overlapped.

Preferably, the UE determines the set of associated PSSCH resources according to a multiple of PSCCH resource pools in a binding relationship with a current PSCCH resource pool, the multiple of PSCCH resource pools in a binding relationship are associated with a same PSSCH resource pool, and a set of subframes of the PSSCH resource pool is a union set of sets of subframes of the multiple of PSCCH resource pools associated with the PSSCH resource pool.

Preferably, a set of subframes of the resource pools is uniquely determined by a bit map and an offset value, wherein the offset value represents an offset of a starting point of the set of subframes from a starting point of a V2X system frame.

Preferably, after being associated to the offset value, the bit map is associated to the successive subframes after the offset value for V2X communication; the first bit of the bit map is associated to the starting point of the set of subframes; the bit map should be repeated for many times until one V2X system frame period is occupied; and, if the length of the V2X system frame period is not an integer multiple of that of the bit map, an excess portion of the last repeated bit map over one V2X system frame period should be truncated.

Preferably, the UE can use two transmission modes:
a PSCCH and a scheduled PSSCH can be transmitted in a same subframe, which is recorded as transmission mode 1;
or, the PSCCH is transmitted prior to the scheduled PSSCH, which is recorded as transmission mode 2.

Preferably, if there is a binding relationship between a PSCCH resource pool C1 and another PSCCH resource pool C2, and the C2 and a PSSCH resource pool S2 associated with the C2 support transmission mode 1, a set of subframes of a PSSCH resource pool S1 associated with the C1 can be a union set of the set of subframes of the C1 and the set of subframes of the C2; and a set of PRBs of the S1 should be a superset of a set of PRBs of the S2.

Preferably, deciding, by the UE, whether there is a multiple of available PSCCH resources within a current transmission period; if so, by the UE, randomly selecting a PSCCH resource from the multiple of available PSCCH resources, or preferentially selecting, from the multiple of available PSCCH resources, a PSCCH resource having a latest time position, or preferentially selecting, from the multiple of available PSCCH resources, a PSCCH resource having a lowest interference level;
wherein the set of resources for PSCCH transmission is all resources in PSCCH resource pools; and, if a subframe n belongs to a PSCCH resource pool selected by the UE, and an interval between the subframe n and the generation time of data pre-transmitted by the UE is less than a maximum tolerable delay of the data, the UE determines PSCCH resources Sc of the subframe n as available PSCCH resources when the PSCCH resources Sc of the subframe n meet one of the following conditions:

the UE has transmitted a PSCCH on PSCCH resources Sc of a subframe n-P;

the UE detects that an average energy of PSCCH resources Sc on a subframe n-iP is less than a pre-defined threshold, where i∈(0,a]; and a service transmitted by the UE is of a particular priority;

where P is a transmission period of the UE, and a is a particular value. Preferably, the set of resources for PSSCH transmission is all resources in PSSCH resource pools;

if a set Sd consisting of one or more PRBs in a PSSCH resource pool of a subframe m meets one of the following conditions, the UE regards the set Sd as available PSCCH resources;

the UE has transmitted a PSSCH on resources Sd in a PSSCH resource pool of a subframe m-P; an interval between the subframe m and the generation time of data pre-transmitted by the UE is less than a maximum tolerable delay of the data; and one or more PRBs in the set Sd are not occupied by other UEs transmitting data having a priority higher than a particular priority;

the UE has not transmitted a PSSCH on resources Sd in a PSSCH resource pool of a subframe m-P; an interval between the subframe m and the generation time of data pre-transmitted by the UE is less than a maximum tolerable delay of the data; one or more PRBs in the set Sd are not occupied by other UEs transmitting data having a higher priority; and the UE detects that the average energy of PSCCH resources Sd on a subframe m-lP is less than a pre-defined threshold, where l∈(0,b];

the UE has not transmitted a PSSCH on resources Sd in a PSSCH resource pool of a subframe m-P; an interval between the subframe m and the generation time of data pre-transmitted by the UE is less than a maximum tolerable delay of the data; one or more PRBs in the set Sd are not occupied by other UEs transmitting data having a higher priority; and when a part of or all of PRBs in the set Sd are scheduled by PSCCHs transmitted by other UEs, the UE detects that the average power of one or more PSCCHs scheduling the PRBs is less than a pre-defined threshold;

the UE detects that the average energy of PSSCH resources Sd on a subframe m-lP is less than a pre-defined threshold, where l∈(0,b]; and if the UE has found that a multiple of subframes have available PSSCH resources within the current transmission period, and the available PSCCH resources are sufficient to bear a data packet transmitted by the UE, the UE randomly selects a PSSCH resource from the available PSSCH resources or preferentially selects a PSSCH resource having a latest time position from the available PSSCH resources;

where b is a particular value.

Preferably, if the data transmitted by the UE has a priority higher than a pre-defined priority, a time interval between the PSCCH time-frequency domain resource for PSCCH transmission and the PSSCH time-frequency domain resource for PSSCH transmission scheduled by the PSCCH, which are both determined by the UE, should be greater than a pre-defined value.

Preferably, the selecting, by the UE, PSCCH and PSSCH resources further comprises: if the power of the UE in transmitting the PSCCH currently exceeds Pr_max_C, the UE can only select, from resources in PSCCH resources other than the subset of PSCCH resource pools, resources for PSCCH transmission.

Preferably, for both the transmission mode 1 and the transmission mode 2, the PSCCH is transmitted for four times, positions of subframes for the four times of transmission are determined by a TRP having an index value of $I_{TRP}=n_{PSCCH3\_1}$ or $n_{PSCCH3\_2}$ in a set of TRPs defined in the Rel-12/13; and for any one of the four subframes, an index of a PSCCH resource for PSCCH transmission is determined according to a relative position of $I_{TRP}$ in a set S, where the set S is a set consisting of $N_{TRP}$ TRPs using the current subframe as a transmitting subframe in the set of TRPs.

Preferably, the selecting, by the UE, PSSCH resources comprises: if the UE uses the transmission mode 1 currently, the number of times of PSSCH transmission of the UE is the same as the number of times of PSCCH transmission, and the PSSCH and the PSCCH scheduling this PSSCH are transmitted in a same subframe.

Preferably, a way of transmitting the PSCCH and the PSSCH comprises: for the transmission mode 1, the position of a PRB transmitting the PSSCH can be indicated by a signaling configured by the eNB or by pre-configuration information;

for the transmission mode 2, information carried in the PSCCH at least contains $$\left\lceil \log_2\left(\binom{\lceil N_{PRB}+1 \rceil}{T}\right)\right\rceil + (T+1)\times \log_2(N_{PRB})$$

bits for indicating the position of a subframe for transmitting the scheduled PSSCH each time and the position of an occupied PRB in each subframe, where T denotes the number of times of PSSCH transmission, and $N_{PRB}$ denotes the number of PRBs on each subframe in a PSSCH resource pool.

Preferably, the way of transmitting the PSCCH and the PSSCH further comprises: if the UE uses the transmission mode 1 currently, the UE should use PSCCH format 1; and, if the UE uses the transmission mode 2 currently, the UE should use PSCCH format 2.

Preferably, a difference between the PSCCH format 1 and the PSCCH format 2 lies in that: the number of bits contained in the PSCCH format 1 is the same as that in the PSCCH format 2, and a UE using the transmission mode 1 needs to set a particular field in the PSCCH as a fixed value.

Preferably, setting, by the UE, PSCCH contents comprises:

a UE using the transmission mode 1 sets a bit field indicated by the position of the subframe for each time of PSSCH transmission in the PSCCH as 0 or 1; and, a UE using the transmission mode 1 sets a bit field indicated by the time-frequency resource for the PSSCH in the PSCCH as 0 or 1.

Preferably, if an index $i_{SA}$ of a PRB for transmitting the PSCCH is less than indexes of all PRBs in the PRB set of the associated PSSCH resource pool, indexes of $N_{PSSCH}$ PRBs for transmitting the scheduled PSSCH are $i_{SA}+1$, $i_{SA}+2, \ldots, i_{SA}+N_{PSSCH}$, respectively; and, if the index $i_{SA}$ of the PRB for transmitting the PSCCH is greater than indexes of all PRBs in the set of PRBs in the associated PSSCH resource pool, indexes of $N_{PSSCH}$ PRBs for transmitting the scheduled PSSCH are $i_{SA}-1$, $i_{SA}-2, \ldots, i_{SA}-N_{PSSCH}$, respectively.

In the technical solutions provided by the present application, first, a UE determines resource pool configurations for a PSCCH and a PSSCH and an association relationship between the both; then, the UE determines, in PSCCH resource pools or a subset of PSCCH resource pools, PSCCH resources required by one or multiple times of PSCCH transmission, and further determines, in PSSCH resource pools associated with the PSCCH resource pools or in a subset of PSSCH resource pools associated with the subset of PSCCH resource pools, time-frequency domain resources for PSSCH transmission; and finally, the UE transmits corresponding information on the determined PSCCH and PSSCH resources. By the method provided by the present application, the requirement on low time delay of V2X services can be met, and the implementation complexity of a UE can be effectively controlled.

MODE FOR THE INVENTION

To make the objectives, technical solutions and advantages of the present application clearer, the present application will be further described below in details by embodiments with reference to the accompanying drawings.

Figure 1:
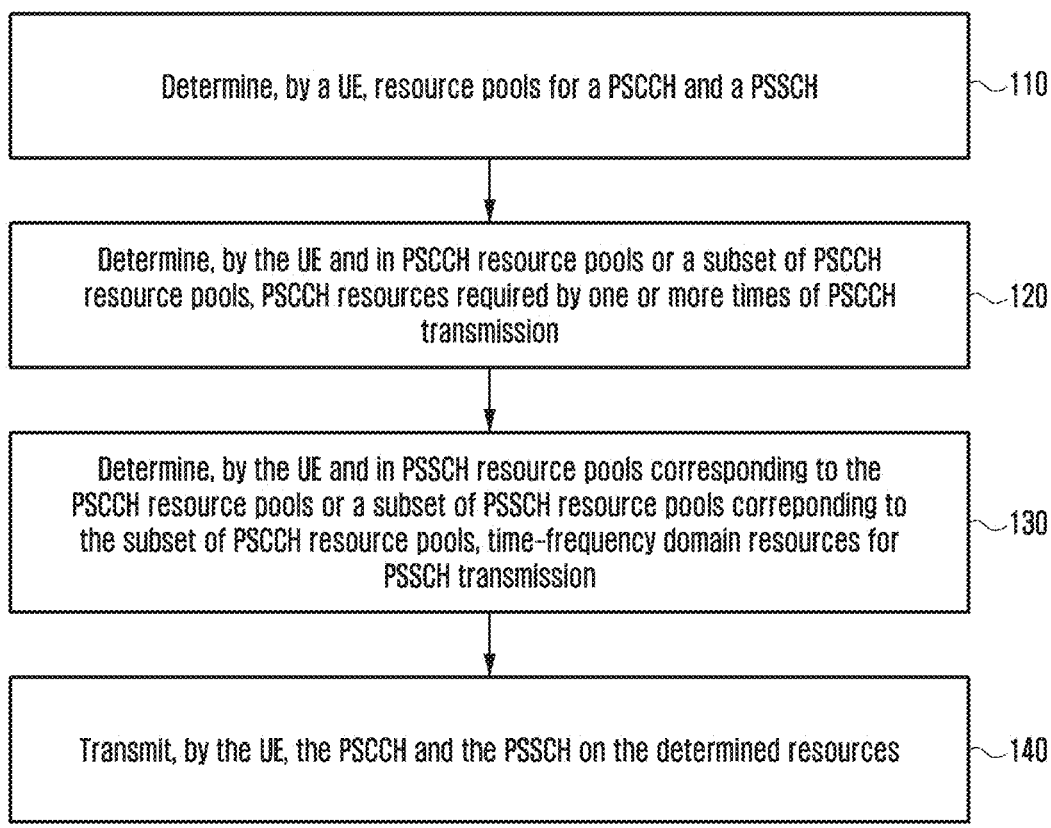
FIG. 1 is an operation flowchart of a transmitting UE according to the present application.

In the V2X communication, in comparison to the current D2D communication, there are higher requirements on the data transmission delay and the data transmission reliability. Due to its deficiencies in the allocation mode of resources for the PSCCH and PSSCH and the resource hopping mode, the existing D2D communication mechanism cannot meet the requirements on low time delay and high reliability of the V2X communication in many cases. Hence, the present application provides a PSCCH resource allocation method. As shown in FIG. 1, a transmitting UE transmits a PSCCH channel and a PSSCH channel by the following steps.

Step 110: By a UE, resource pools for a PSCCH and a PSSCH are determined.

In the present application, the UE can determine configurations of the two above resource pools by receiving an eNB signaling or by pre-configuration. From the perspective of the whole system, the PSCCH resource pool and the PSSCH resource pool occupy same subframes; and in a same subframe, the positions of PRBs occupied by the PSCCH resource pool and the PSSCH resource pool are not completely identical.

Step 120: By the UE, PSCCH resources required by one or multiple times of PSCCH transmission are determined in PSCCH resource pools or a subset of PSCCH resource pools.

In the present application, a PSCCH resource refers to the number of PRBs for one PSCCH transmission. A same PSCCH can be transmitted for one or multiple times. If a PSCCH is transmitted for multiple times, resources occupied by the multiple times of PSCCH transmission are completely independent, or resources occupied by the multiple times of PSCCH transmission are determined by certain pre-defined or pre-configured resource patterns, where each resource pattern is associated to a unique index value.

The UE determines the subset of resource pools by receiving an eNB signaling or by pre-configuration, and the subset of resource pools can be associated to one or more PSCCH resources or associated to one or more PSCCH patterns.

In the present application, a PSCCH and a scheduled PSSCH can be transmitted in a same subframe, or the PSCCH is always transmitted prior to the scheduled PSSCH. In the present application, the former is called transmission mode 1, and the latter is called transmission mode 2.

In the case of a configured or pre-configured subset of PSCCH resource pools, the UE can determines a transmission mode and selects positions of PSCCH resources according to the service type. For example, if the data transmitted by the UE is of a first service type, the UE uses the transmission mode 1, and the UE selects PSCCH resources in the subset of PSCCH resource pools; and, if the data transmitted by the UE is of a second service type, the UE uses the transmission mode 2, and selects PSCCH resources in PSCCH resource pools. The first service type and the second service type are defined by the standard. Specifically, during implementation inside the UE, the service type can be decided by a service layer of the UE. The service layer of the UE gives a corresponding indication to an access layer of the UE, and the access layer of the UE selects PSCCH resources from a corresponding set (PSCCH resource pools or a subset of PSCCH resource pools) according to the indication (the service type 1 or 2) from the service layer.

In addition, in the present application, the UE can transmit the PSCCH and PSSCH always in accordance with the transmission mode 1 or always in accordance with the transmission mode 2.

Step 130: By the UE, a time-frequency domain resource for PSSCH transmission is determined in PSSCH resource pools associated with the PSCCH resource pools or a subset of PSSCH resource pools associated with the subset of PSCCH resource pools.

The PSSCH resource pools associated with the PSCCH resource pools are PSSCH resource pools within this PSCCH period, or PSSCH resource pools within a next PSCCH period. Subframes contained in the subset of PSCCH resource pools are completely identical with subframes contained in the associated subset of PSSCH resource pools.

In the present application, a same PSSCH can be transmitted for one or multiple times. If a PSSCH is transmitted for multiple times, resources occupied by the multiple times of PSSCH transmission are completely independent of each other, or resources occupied by the multiple times of PSSCH transmission are determined by certain pre-defined or pre-configured resource patterns, where each resource pattern is associated to a unique index value.

The UE determines the subset of PSSCH resource pools by receiving an eNB signaling or by pre-configuration.

Step S140: By the UE, the PSCCH and the PSSCH are transmitted on the determined resources.

In the present application, the PSCCH transmitted by the UE should at least contain a PSSCH time-frequency resource indication. In the case of the configured or pre-configured subsets of PSCCH and PSSCH resource pools, the PSCCH should contain a transmission mode (transmission mode 1 or 2) capable of being indicative of PSCCH association.

It is to be specifically noted that the present application is not limited to the execution sequence of the above steps.

To easily understand the present application, the technical solutions of the present application will be further described below in a device-to-device interaction mode and in combination with specific applications.

Embodiment 1

In this embodiment, a UE determines PSCCH and PSSCH resource pools by receiving an eNB signal or by pre-configuration, and in all cases, the UE transmits a PSCCH and a PSSCH always in accordance with transmission mode 1. Specific implementation steps are as follows.

Step 210: By a UE, PSCCH resource pools and associated PSSCH resource pools are determined.

In this embodiment, positions of subframes of the PSCCH and of PSSCH resource pools can be indicated by a same bit map, and positions of PRBs of the PSCCH and PSSCH resource pools on each subframe are not overlapped. The PSCCH resource pools are associated with PSSCH resource pools at a same subframe position.

Step 220: By the UE, PSCCH resources required by multiple times of PSCCH transmission are determined in the PSCCH resource pools.

In this embodiment, each PSCCH can be transmitted for two times or four times, and PSCCH resources for the multiple times of PSCCH transmission can be completely independent of each other or be determined by a certain pre-defined resource pattern.

The UE autonomously selects, from the PSCCH resource pools, PSCCH resources for multiple times of PSCCH transmission (if the PSCCH resources for the multiple times of PSCCH transmission are completely independent), or selects a resource pattern index $n_{PSCCH1}$ associated with the PSCCH resources for multiple times of PSCCH transmission. The UE can perform autonomous selection according to one or more of the result of resource detection, its own location, a random resource selection mechanism and other methods, and the way of autonomously selecting PSCCH resources by the UE is not limited in the present application, similarly hereinafter.

If a PSSCH is transmitted for two times, a way of determining, by the UE, positions of PSCCH resources for the first PSCCH transmission and the second PSCCH transmission through a resource pattern index is the same as the way of determining resources for PSCCH transmission as defined in the Rel-12/13.

If a PSCCH is transmitted for four times, positions of subframes for the four times of transmission are determined by a TRP having an index value of $I_{TRP}=n_{PSCCH1}$ in the set of TRPs as defined in the Rel-12/13; and, for any one of the four subframes, an index of a PSCCH resource for PSCCH transmission is determined in the following ways:

1. a set S consisting of $N_{TRP}$ TRPs using the current subframe as a transmitting subframe is determined in the set of TRPs;
2. indexes of the TRPs in the set S are sequenced in an ascending order or a descending order, and a relative sequence $\tilde{n}_{TRP}$ of $I_{TRP}$ in the set S is determined; and
3. an index $n_{TRP}$ of a PSCCH resource for PSCCH transmission is determined by:

$$n_{TRP}=(\tilde{n}_{TRP}+f_{hop}(i)\cdot Ns) \bmod N_{TRP}$$

where Ns is a determined value defined by the standard or configured by a central control node, and Ns can be $N_{TRP}/4$; and, $f_{hop}(i)$ is a determined frequency hopping factor defined by the standard or configured by the central control node, and $f_{hop}(i)$ can be expressed by:

$$f_{hop}(i) = \begin{cases} 0 & Ns = 1 \\ \left(\sum_{k=i\cdot 10+1}^{i\cdot 10+9} c(k)\times 2^{k-(i\cdot 10+1)}\right) \bmod Ns & Ns = 2 \\ \left(\sum_{k=i\cdot 10+1}^{i\cdot 10+9} c(k)\times 2^{k-(i\cdot 10+1)}\right) \bmod (Ns-1) + 1) \bmod Ns & Ns > 2 \end{cases}$$

where c(k) is a pseudorandom sequence defined by the standard.

Step 230: By the UE, a time-frequency domain resource for PSSCH transmission is determined in the PSSCH resource pools associated with the PSCCH resource pools.

The number of times of PSSCH transmission by the UE is the same as that of the PSCCH transmission, and a subframe for the $i^{th}$ PSSCH transmission is the same as that for the $i^{th}$ PSCCH transmission.

If a PSSCH is transmitted for two times, a starting PRB position a1 for the first PSSCH transmission is autonomously selected from the first associated PSCCH transmission subframe by the UE, and a starting PRB position a2 for the second PSSCH transmission still can be autonomously selected from the second associated PSCCH transmission subframe by the UE or determined by the following formula:

$$a2=\bmod(a1+\lfloor M^{PSSCH}/2 \rfloor, M^{PSSCH})$$

where $M_{PSSCH}$ denotes the number of PRBs contained in PSSCH resources pools in each subframe.

If a PSSCH is transmitted for four times, a starting PRB position b1 for the first PSSCH transmission is acquired by a configuration signaling from an eNB or pre-configuration signaling from an eNB, and starting PRB positions for the subsequent three times of PSSCH transmission can be autonomously selected from the corresponding subframes by the UE or determined by the following formula:

$$b_i=\bmod(b_{i-1}+(i-1)\cdot\lfloor M^{PSSCH}/4 \rfloor, M^{PSSCH})$$

where $2\leq i\leq 4$.

Step 240: By the UE, a PSCCH and a PSSCH are transmitted on the resources determined in the steps 220 and 230.

Information carried in the PSCCH should at least contain a starting PRB position and the number of PRBs for this PSSCH transmission. In addition, if the resources for multiple times of PSCCH transmission are completely independent, the information carried in the PSCCH should contain indication information indicating how many times the PSCCH has been transmitted.

Now, this embodiment ends. By the method provided in this embodiment, a PSCCH and a scheduled PSSCH can be transmitted in a same subframe. Ideally, a receiving UE can decode both the PSCCH and the PSSCH simultaneously in a subframe, so it is advantageous for the reduction of transmission delay of data. However, in a case where the reliability is ensured by receiving the PSCCH for multiple times and decoding the PSCCH by soft combination, a receiving UE needs to cache soft bit information of all PSSCHs in corresponding subframes before successfully decoding the PSCCH, so that the implementation complexity and cost of the UE are increased.

Embodiment 2

In this embodiment, a UE determines PSCCH and PSSCH resource pools by receiving an eNB signaling or by pre-configuration, and, in all cases, the UE transmits a PSCCH and a PSSCH always in accordance with transmission mode 2. Specific implementation steps are as follows.

Step 310: By a UE, PSCCH resource pools and its associated PSSCH resource pools are determined.

In this embodiment, positions of subframes of the PSCCH and PSSCH resource pools can be indicated by a same bit map, and positions of PRBs of the PSCCH and PSSCH resource pools on each subframe are not overlapped. In the time domain, the $n^{th}$ PSCCH resource pool is associated with the $(n+1)^{th}$ PSSCH resource pool.

Preferably, the time length of the PSCCH and PSSCH resource pools should be less than 50 ms.

Step 320: By the UE, PSCCH resources required by multiple times of PSCCH transmission are determined in the PSCCH resource pools.

In this embodiment, each PSCCH can be transmitted for two times or four times, and PSCCH resources for the multiple times of PSCCH transmission can be completely independent or be determined by a certain pre-defined resource pattern.

The UE autonomously selects, from the PSCCH resource pools, PSCCH resources for multiple times of PSCCH transmission, or selects a resource pattern index $n_{PSCCH2}$ associated with the PSCCH resources for multiple times of PSCCH transmission.

If a PSSCH is transmitted for two times, a way of determining, by the UE, positions of PSCCH resources for the first PSCCH transmission and the second PSCCH transmission through a resource pattern index is the same as the way of determining resources for PSCCH transmission defined in the Rel-12/13.

If a PSCCH is transmitted for four times, positions of subframes for the four times of transmission are determined by a TRP having an index value of $I_{TRP}=n_{PSSCH2}$ in the set of TRPs as defined in the Rel-12/13; and, for any one of the four subframes, a way of determining an index of a PSCCH resource for PSCCH transmission is the same as in the step 220.

Step 330: By the UE, a time-frequency domain resource for PSSCH transmission is determined in the PSSCH resource pools associated with the PSCCH resource pools.

In this embodiment, the UE autonomously selects, from the associated PSSCH resource pools, a time-frequency domain resource for PSSCH transmission.

Step 340: By the UE, a PSCCH and a PSSCH are transmitted on the resources determined in the steps 220 and 230.

Information carried in the PSCCH should at least contain the position of a subframe for transmitting the scheduled PSSCH each time, and the position of the PRB occupied in each subframe. The two items indicate that the occupied number of bits is:

$$\left\lceil \log_2\left(\binom{\lceil N_{PRB}+1 \rceil}{T}\right) \right\rceil + (T+1) \times \log_2(N_{PRB})$$

bits, where $N_{PRB}$ denotes the number of PRBs contained in the current V2X communication bandwidth, and T is equal to 2 or 4 and denotes the total number of times of PSSCH transmission.

Now, this embodiment ends. By the method provided in this embodiment, the PSCCH is always transmitted prior to the scheduled PSSCH, a receiving UE can receive the PSSCH according to the scheduling information indicated by the PSCCH after decoding the PSCCH, without caching all soft bits of the PSSCH, so that it is advantageous for the reduction of implementation complexity of the UE. However, the transmission delay of data in this embodiment is large.

Embodiment 3

In this embodiment, a UE determines PSCCH and PSSCH resource pools and subsets of the PSCCH and/or PSSCH resource pools by receiving an eNB signaling or by pre-configuration. The UE determines, in the PSSCH resource pools or the subset of PSCCH resource pools, resources for PSCCH transmission according to the service type. Specific implementation steps are as follows.

Step 410: By a UE, PSCCH resource pools and its associated PSSCH resource pools, as well as a subset of PSCCH resource pools and a subset of its associated PSSCH resource pools, are determined.

In this embodiment, positions of subframes of the PSCCH and PSSCH resource pools can be indicated by a same bit map, and positions of PRBs of the PSCCH and PSSCH resource pools on each subframe are not overlapped. In the time domain, a PSCCH resource pool indicated by the current bit map is associated with a PSSCH associated resource pool indicated by the next bit map.

Figure 2:
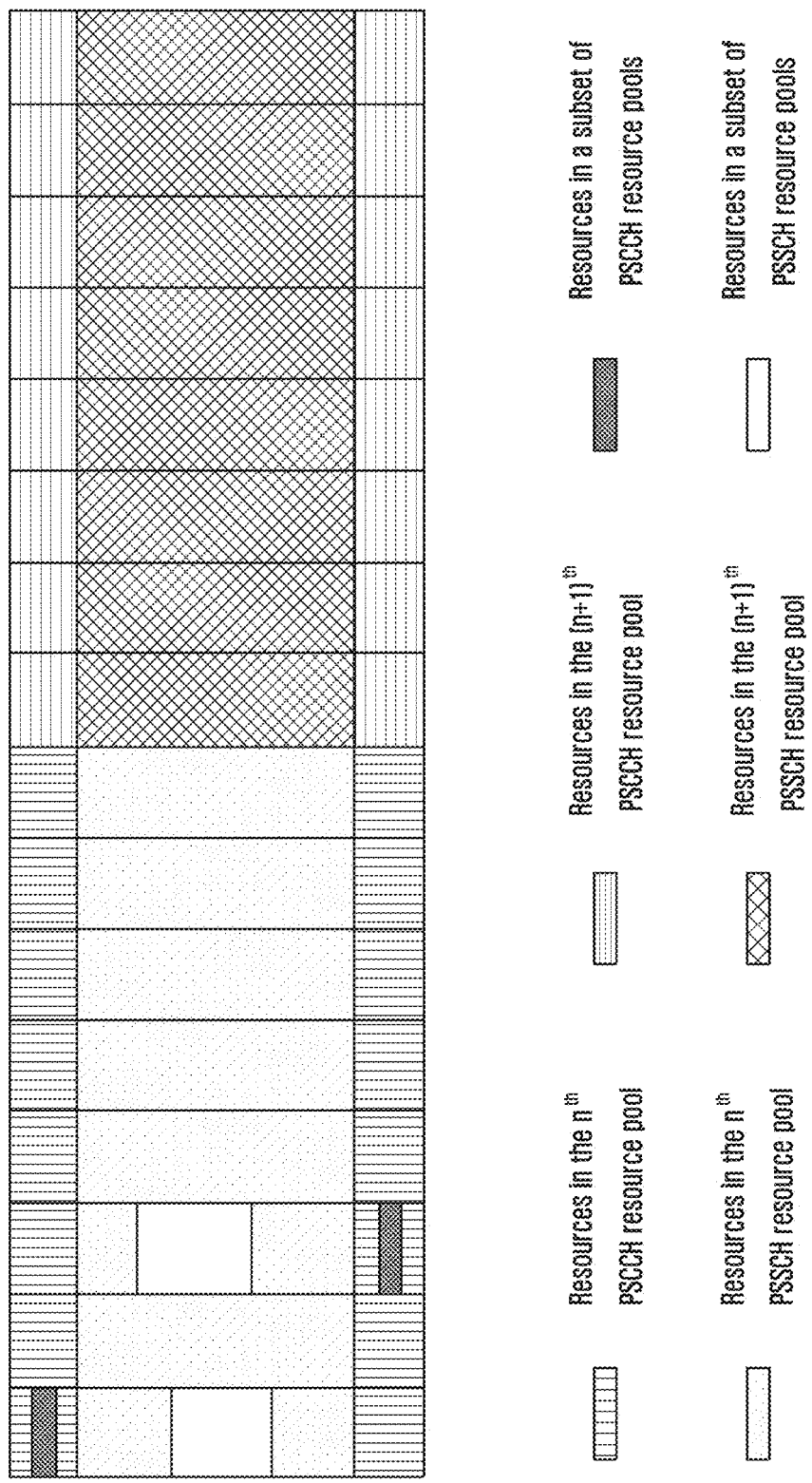
FIG. 2 is a schematic diagram of PSCCH and PSSCH resource subset configurations according to the present application.

In this embodiment, the subset of PSCCH resource pools contains one or more PSCCH patterns, where the PSCCH patterns are defined by the standard. Subframes contained in the subset of PSSCH resource pools associated with the subset of PSCCH resource pools are completely identical, and positions of PRBs are not overlapped, as shown in FIG. 2.

The subset of PSCCH resource pools can be associated with a parameter Pr_max_C configured by an eNB or pre-configured, and the UE determines, according to the parameter Pr_max_C associated with the subset of resource pools and the current transmitting power, that all resources in the subset of PSCCH resource pools can be selected. The subset of PSSCH resource pools can be associated with a parameter Pr_max_S configured by an eNB or preconfigured, and the UE determines, according to the parameter Pr_max_S associated with the subset of resource pools and the current transmitting power, that all resources in the subset of PSSCH resource pools can be selected.

Step 420: By the UE, PSCCH resources required by one or multiple times of PSCCH transmission are determined in the PSCCH resource pools or the subset of PSCCH resource pools.

If data transmitted by the UE is of the service type 1, the UE uses transmission mode 1 (that is, a PSCCH and a scheduled PSSCH are transmitted in a same subframe), and the UE selects PSCCH transmission resources in the subset of PSCCH resource pools. If only one PSCCH resource pattern is contained in the subset of PSCCH resource pools, the UE selects resources associated with the pattern as PSCCH transmission resources. If a multiple of PSCCH resource pool patterns are contained in the subset of PSCCH resource pools, the UE can randomly select a PSCCH resource pattern, where the index of the resource pattern is $n_{PSCCH3\_1}$.

If data transmitted by the UE is of service type 2, the UE uses transmission mode 2 (that is, a PSCCH is always transmitted prior to a scheduled PSSCH). If the power of the UE in transmitting the PSCCH currently does not exceed Pr_max_C, the UE can select PSCCH resources from the PSCCH resource pools. If the power of the UE in transmitting the PSCCH currently exceeds Pr_max_C, the UE can select resources for PSCCH transmission only from resources in the PSCCH resources other than the subset of PSCCH resource pools. The UE can determine the power for transmitting the PSCCH through an open-loop power control parameter configured by the eNB or its own absolute velocity or more, and the specific way of determining the power for transmitting the PSCCH is not limited in the present application. The UE can select an index $f_{PSCCH3\_2}$ of a resource pattern associated with the PSCCH transmission resources, according to one or more of the result of idle resource detection, its own location and the random resource selection.

In the present application, the PSSCH can be transmitted for two times, and the way of determining, by the UE, positions of PSCCH resources for the first PSCCH transmission and the second PSCCH transmission through a resource pattern index is the same as the way of determining resources for PSCCH transmission as defined in the Rel-12/13.

In addition, in the present application, the PSCCH can be transmitted for four times, positions of subframes for the four times of transmission are determined by a TRP having an index value of $I_{TRP}=n_{PSCCH3\_1}$ or $n^{PSCCH3\_2}$ in a set of TRPs as defined in the Rel-12/13; and for any one of the four subframes, an index of a PSCCH resource for PSCCH transmission is determined by a relative position of $I_{TRP}$ in a set S, where the set S is a set consisting of $N_{TRP}$ TRPs using the current subframe as a transmitting subframe in the set of TRPs.

Specifically, the UE determines the position in the following ways:

1. a set S consisting of $N_{TRP}$ TRPs using the current subframe as a transmitting subframe is determined in the set of TRPs;
2. indexes of the TRPs in the set S are sequenced in an ascending order or a descending order, and a relative sequence ñTRP of $I_{TRP}$ in the set S is determined; and
3. an index $ñ_{TRP}$ of a PSCCH resource for PSCCH transmission is determined based on the $ñ_{TRP}$ and the determined frequency hopping factor defined by the standard or configured by a central control node:

$$n_{TRP}=(ñ_{TRP}+f_{hop}(i)\cdot Ns) \bmod N_{TRP}$$

where Ns is a determined value defined by the standard or configured by a central control node, and Ns can be $N_{TRP}/4$; and, $f_{hop}(i)$ is a determined frequency hopping factor defined by the standard or configured by the central control node, and $f_{hop}(i)$ can be expressed by:

$$f_{hop}(i) = \begin{cases} 0 & Ns = 1 \\ \left(\sum_{k=i\cdot 10+1}^{i\cdot 10+9} c(k) \times 2^{k-(i\cdot 10+1)}\right) \bmod Ns & Ns = 2 \\ \left(\sum_{k=i\cdot 10+1}^{i\cdot 10+9} c(k) \times 2^{k-(i\cdot 10+1)}\right) \bmod (Ns-1)+1) \bmod Ns & Ns > 2 \end{cases}$$

where c(k) is a pseudorandom sequence defined by the standard.

Step 430: By the UE, a time-frequency domain resource for PSSCH transmission is determined in the PSSCH resource pools associated with the PSCCH resource pools or the subset of PSSCH resource pools associated with the subset of PSCCH resource pools.

If the UE uses the transmission mode 1 currently, the number of times of PSSCH transmission of the UE is the same as the number of times of PSCCH transmission, and the PSSCH and the PSCCH scheduling this PSSCH are transmitted in a same subframe.

If the PSSCH is transmitted for two times, a starting PRB position a1 for the first PSSCH transmission is acquired by a signaling configured by the eNB or by a pre-configuration signaling, and a starting PRB position a2 for the second PSSCH transmission is determined by the following formula:

$$a2 = \bmod(a1 + \lfloor M^{PSSCH}/2 \rfloor, M^{PSSCH}),$$

where $M^{PSSCH}$ denotes the number of PRBs contained in PSSCH resources pools in each subframe.

If the PSSCH is transmitted for four times, a starting PRB position a1 for the first PSSCH transmission is acquired by a signaling configured by the eNB or by a pre-configuration signaling, and starting PRB positions of subsequent three times of PSSCH transmission are determined by the following formula:

$$a_i = \bmod(a_{i-1} + (i-1) \cdot \lfloor M^{PSSCH}/4 \rfloor, M^{PSSCH}),$$

where $2 \le i \le 4$.

If the UE uses the transmission mode 2 currently, the UE autonomously selects PSSCH resources from the PSSCH resource pools associated with the PSCCH resource pools, and the UE can select PSSCH resources according to one or more of the result of resource detection, its own location, a random resource selection mechanism and other methods.

Step 440: By the UE, a PSCCH and a PSSCH are transmitted on the determined resources.

In this embodiment, for the transmission mode 1, the position of a PRB transmitting the PSSCH can be indicated by a signaling configured by the eNB or by pre-configuration information.

If the UE uses the transmission mode 1 currently, the UE should use PSCCH format 1; and if the UE uses the transmission mode 2 currently, the UE should use PSCCH format 2.

The PSCCH format 2 should at least contain information the same as in the step 340 of Embodiment 2.

As an implementation of the present application, the number of bits contained in the PSCCH format 1 can be the same as that in the PSCCH format 2. In this case, the UE using the transmission mode 1 needs to set a particular field in the PSCCH as a fixed value. For example, bit fields indicated by the positions of subframes for each PSSCH transmission are set as 0 or 1. Or, if the positions of PRBs of the PSSCH can be indicated by a signaling configured by the eNB or by pre-configuration information, bit fields indicated by all PSSCH time-frequency resources in the PSCCH can be set as 0 or 1.

Or, the number of bits contained in the PSCCH format 1 can be different from that in the PSCCH format 2. For example, the positions of PRBs of the PSSCH can be indicated by a signaling configured by the eNB or by pre-configuration information. In this case, the PSCCH may not contain bit fields indicating the positions of PRBs for PSSCH transmission.

Now, this embodiment ends. This embodiment has the advantages of both Embodiment 1 and Embodiment 2, a service having a higher requirement on the time delay can perform data transmission in the transmission mode 1. The implementation complexity of the receiving UE will not be increased significantly because the probability of generating such a service is low in an actual V2X communication environment. For a service having a lower requirement on the time delay, data transmission can be performed in the transmission mode 2.

Embodiment 4

In this embodiment, a UE determines PSCCH and PSSCH resource pools by receiving an eNB signaling or by pre-configuration. Each PSCCH resource pool is associated with a unique PSSCH resource pool, while one PSSCH resource pool can be associated with one or more PSCCH resource pools. The UE selects PSCCH resources from the corresponding PSCCH resource pools according to one or more of the transmission period, the result of channel detection, the priority of transmission services and other information, and selects PSSCH resources from the PSSCH resource pools associated with the PSCCH resource pools according to the result of channel detection. Specific implementation steps are as follows.

Step 510: By a UE, PSCCH resource pools and associated PSSCH resource pools are determined.

Figure 3:
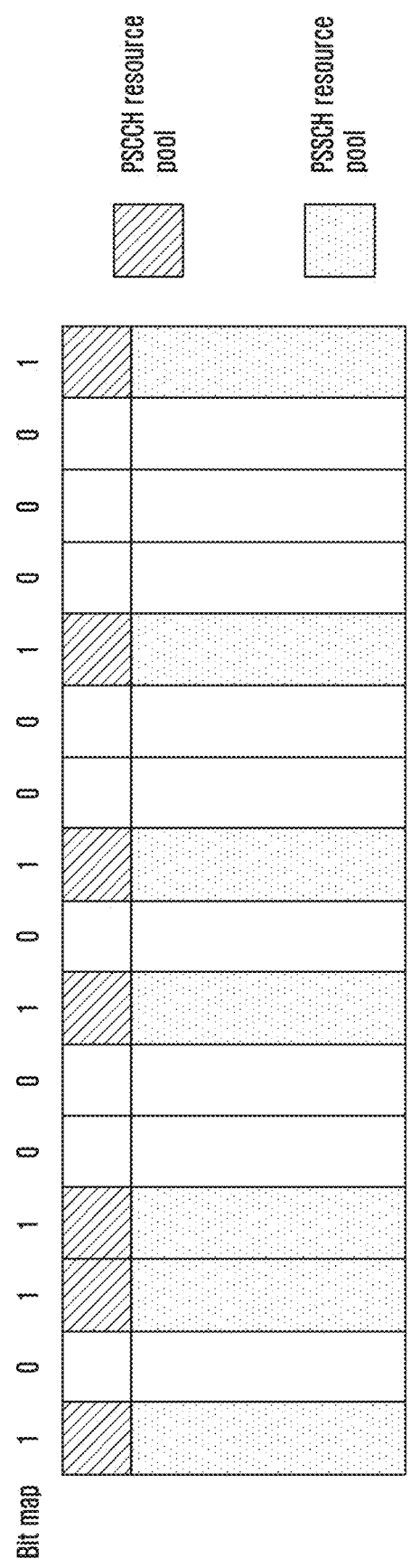
FIG. 3 is a schematic diagram of a correspondence between one PSSCH resource pool and one PSCCH resource pool according to the present application.

In accordance with an implementation of the present application (resource pool association mode 1), any one of the PSCCH resource pools is associated with one PSSCH resource pool; and vice versa. Positions of subframes of the PSCCH and PSSCH resource pools can be indicated by a same bit map, and positions of PRBs of the PSCCH and PSSCH resource pools on each subframe are not overlapped, as shown in FIG. 3.

Figure 4:
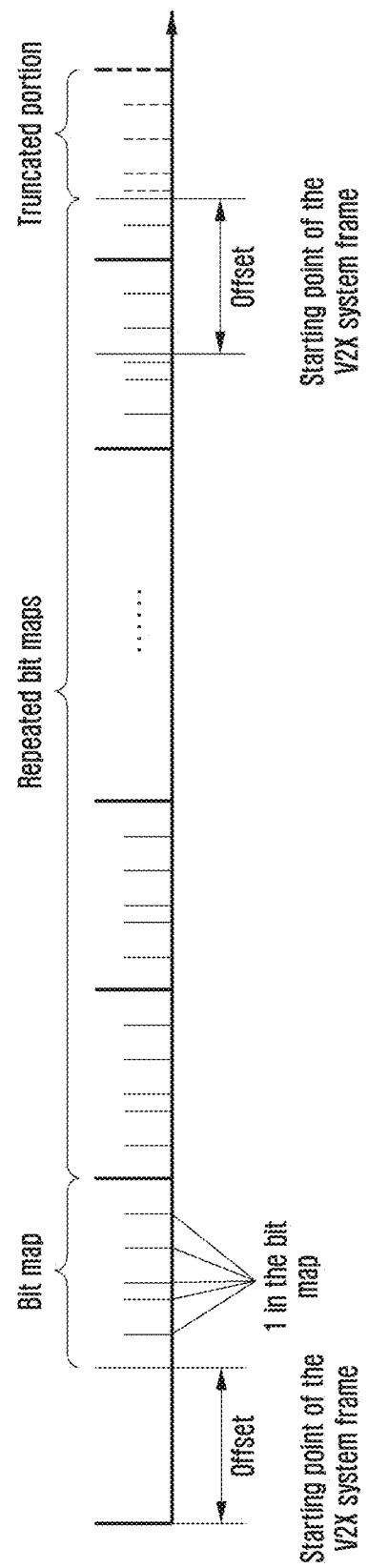
FIG. 4 is a schematic diagram of a configuration method of a set of subframes according to the present application.
Figure 5:
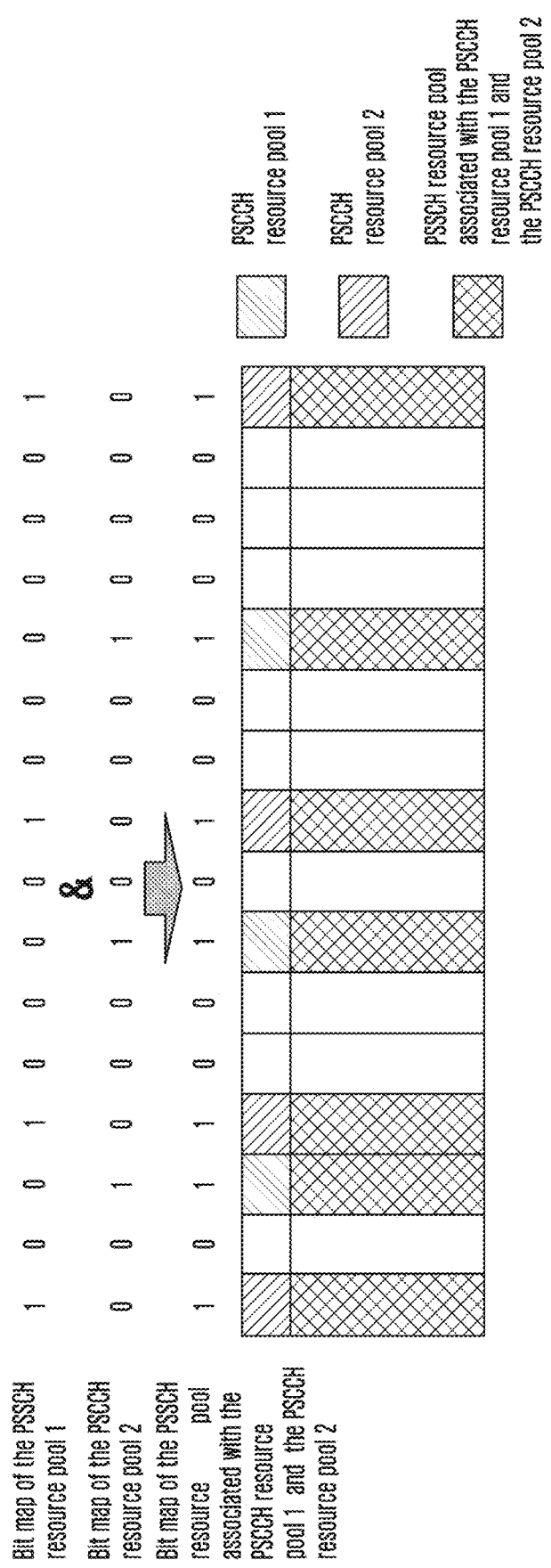
FIG. 5 is a schematic diagram of a correspondence between one PSSCH resource pool and two PSSCH resource pools according to the present application.

Preferably, a set of subframes can be uniquely determined by a bit map and an offset value, wherein the offset value represents an offset of a starting point of the set of subframes from a starting point of a V2X system frame. The UE determines the position of the starting point of the V2X system frame by a synchronous source. The bit map is associated to the successive subframes after the offset value for V2X communication. The first bit (or lowest bit) of the bit map is associated to the starting point of the set of subframes, and the bit map should be repeated for many times until one V2X system frame period is occupied. If the length of the V2X system frame period is not an integer multiple of that of the bit map, an excess portion of the last repeated bit map over one V2X system frame period should be truncated, as shown in FIG. 4.

In accordance with another implementation of the present application (resource pool association mode 2), there is a binding relationship between a multiple of PSCCH resource pools, and a multiple of PSCCH resources pools in a binding relationship are associated with a same PSSCH resource pool. The number of PSCCH resource pools in a binding relationship can be 2 or greater than 2. For each PSCCH resource pool, the set of subframes can be configured by the above method. In this case, the set of subframes of the PSSCH resource pools is a union set of sets of subframes of a multiple of PSCCH resource pools associated with the PSSCH resource pools.

Step 520: By the UE, PSCCH resources required by one or multiple times of PSCCH transmission are determined in the corresponding PSCCH resource pools.

For the resource pool association mode 1, the UE directly selects the PSCCH resource pools determined in the step 510. For the resource pool association mode 2, the UE selects a corresponding PSCCH resource pool according to the priority of the transmission service. For example, if the pre-transmitted service has a priority higher than a certain priority, a PSCCH resource pool A is selected; or otherwise, a PSCCH resource pool B is selected, wherein the UE can determine a correspondence between the service priority and the PSCCH resource pools by defining by the standard or configuring by the eNB.

In the selected PSCCH resource pool, the UE semi-statically occupies the same PSCCH resources by taking P as a transmission period.

Preferably, if a subframe n belongs to the PSCCH resource pool selected by the UE, and a time interval between the subframe n and the generation time of the data pre-transmitted by the UE is less than the maximum tolerable delay of the data, the UE regards PSCCH resources Sc of the subframe n as available PSCCH resources when the PSCCH resources Sc of the subframe n meet one of the following conditions:

the UE has transmitted a PSCCH on PSCCH resources Sc of a subframe n-P;

the UE detects that an average energy of PSCCH resources Sc on a subframe n-iP is less than a pre-defined threshold, where $i \in (0,a]$, and the value of a is defined by the standard, for example, a=2; or, a service transmitted by the UE is of a particular priority, where the particular priority is defined by the standard. For example, if the service transmitted by the UE is of the highest priority, the UE can select any PSCCH resource.

Preferably, if the service priority corresponding to the PSCCH resource pool of the subframe n is higher than the priority of the service pre-transmitted by the UE, and a time interval between the subframe n and the generation time of the data pre-transmitted by the UE is less than the maximum tolerable delay of the data, the UE regards PSCCH resources Sc of the subframe n as available PSCCH resources when the PSCCH resources Sc of the subframe n meet one of the following conditions:

the UE detects that an average energy of PSCCH resources Sc on a subframe n-iP is less than a pre-defined threshold, where $i \in (0,a]$, and the value of a is defined by the standard, for example, a=2; and, the transmitting power of the UE is less than a certain threshold value defined by the standard.

Preferably, if the service priority corresponding to the PSCCH resource pool of the subframe n is lower than the priority of the service pre-transmitted by the UE, and a time interval between the subframe n and the generation time of the data pre-transmitted by the UE is less than the maximum tolerable delay of the data, the UE can use all PSCCH resources Sc of the subframe n as available PSCCH resources.

If the UE has found a multiple of available PSCCH resources within the current transmission period, the UE can randomly select a PSCCH resource from the available PSCCH resources, or preferentially select a PSCCH resource having a latest time position, or preferentially select a PSCCH resource having the lowest interference level.

Preferably, the length of the transmission period is an integer multiple of the length of the bit map used for configuring the set of subframes of the resource pool in the step 510.

Step 530: By the UE, a time-frequency domain resource for PSSCH transmission is determined in the PSSCH resource pools associated with the PSCCH resource pools.

In this embodiment, the UE semi-statically occupies the same PSSCH resources by taking P as a transmission period. Preferably, if a set Sd consisting of one or more PRBs in a PSSCH resource pool of a subframe m meets one of the following conditions, the UE regards Sd as available PSCCH resources:

the UE has transmitted a PSSCH on resources Sd in a PSSCH resource pool of a subframe m-P; an interval between the subframe m and the generation time of data pre-transmitted by the UE is less than a maximum tolerable delay of the data; and one or more PRBs in the set Sd are not occupied by other UEs transmitting data having a high priority;

or:

the UE has not transmitted a PSSCH on resources Sd in a PSSCH resource pool of a subframe m-P; an interval between the subframe m and the generation time of data pre-transmitted by the UE is less than a maximum tolerable delay of the data; one or more PRBs in the set Sd are not occupied by other UEs transmitting data having a higher priority; and the UE detects that the average energy of PSCCH resources Sd on a subframe m-lP is less than a certain threshold, where l∈(0,b], and the value of b is defined by the standard, for example, b=2;

or:

the UE has not transmitted a PSSCH on resources Sd in a PSSCH resource pool of a subframe m-P; an interval between the subframe m and the generation time of data pre-transmitted by the UE is less than a maximum tolerable delay of the data; one or more PRBs in the set Sd are not occupied by other UEs transmitting data having a higher priority; and when a part of or all of PRBs in the set Sd are scheduled by PSCCHs transmitted by other UEs, the UE detects that the average power of one or more PSCCHs scheduling the PRBs is less than a certain threshold;

or:

the UE detects that the average energy of PSSCH resources Sd on a subframe m-lP is less than a certain threshold, where l∈(0,b], and the value of b is defined by the standard, for example, b=2.

If the UE has found that a multiple of subframes have available PSSCH resources within the current transmission period, and the available PSCCH resources are sufficient to bear a data packet transmitted by the UE, the UE randomly selects a PSSCH resource from the available PSSCH resources or preferentially selects a PSSCH resource having a latest time position from the available PSSCH resources.

In addition, if the data transmitted by the UE has a priority higher than a certain priority defined by the standard, to leave a UE transmitting a service of low priority enough time to decode the PSCCH transmitted by the UE, the time interval between the PSCCH transmitted by the UE and the scheduled PSSCH should be greater than a certain particular value defined by the standard, for example, greater than 2.

Step 540: By the UE, a PSCCH and a PSSCH are transmitted on the determined resources.

The PSCCH should contain one or more of the following information fields:

1. the position of a subframe of the scheduled PSSCH;
2. the position of a PRB occupied by the scheduled PSSCH;
3. the modulation coding mode of the scheduled PSSCH;
4. an ID of a transmitting UE;
5. an index of a transmitting TB;
6. the number of times of transmission by the current TB; and
7. the priority of a service borne in the PSSCH, wherein the position of the subframe of the scheduled PSSCH can be in a subframe the same as or different from the PSCCH; the transmission mode 1 is used in the former case, or the transmission mode 2 is used in the latter case. The index of the transmitting TB is used for distinguishing between different transmitting TBs, and the number of times of transmission by the current TB is used for indicating that this scheduled PSSCH is for which time of transmission by the current TB.

Now, this embodiment ends. In this embodiment, services of different priorities can share a same PSCCH resource pool to avoid wasting the PSCCH resources, or services of a high priority occupy separated PSCCH resource pools to avoid the influence on services of a high priority by services of a low priority. When services of different priorities share a same PSSCH resource pool, a UE transmitting services of a high priority indicate the position of the occupied PSSCH through a PSCCH, while a UE transmitting services of a low priority should avoid selecting the PSSCH resources scheduled by the PSCCH after detecting the PSCCH. In this way, the waste of resources in the PSCCH resource pools and PSSCH resource pools can be avoided, and the transmission of services of a high priority can be protected.

Embodiment 5

In this embodiment, a PSCCH and a scheduled PSSCH can be transmitted in a same subframe, and in this case, frequency-domain resources for the both must be continuous. This mode is called transmission mode 1. The PSCCH and the scheduled PSSCH can also be transmitted in different subframes. This mode is called transmission mode 2. A UE determines PSCCH and PSSCH resource pools by receiving an eNB signaling or by pre-configuration. Each PSCCH resource pool is associated with a unique PSSCH resource pool. The UE needs to further determine a transmission mode supported by the current PSCCH resource pool and the associated PSSCH resource pool. However, one PSSCH resource pool can be associated with one or more PSCCH resource pools. The UE selects PSCCH resources from the corresponding PSCCH resource pools according to one or more of the transmission period, the result of channel detection, the priority of transmission services and other information, and selects PSSCH resources from the PSSCH resource pools associated with the PSCCH resource pools according to the result of channel detection. Specific implementation steps are as follows.

Step 610: By a UE, PSCCH resource pools and associated PSSCH resource pools are determined.

Figure 6:
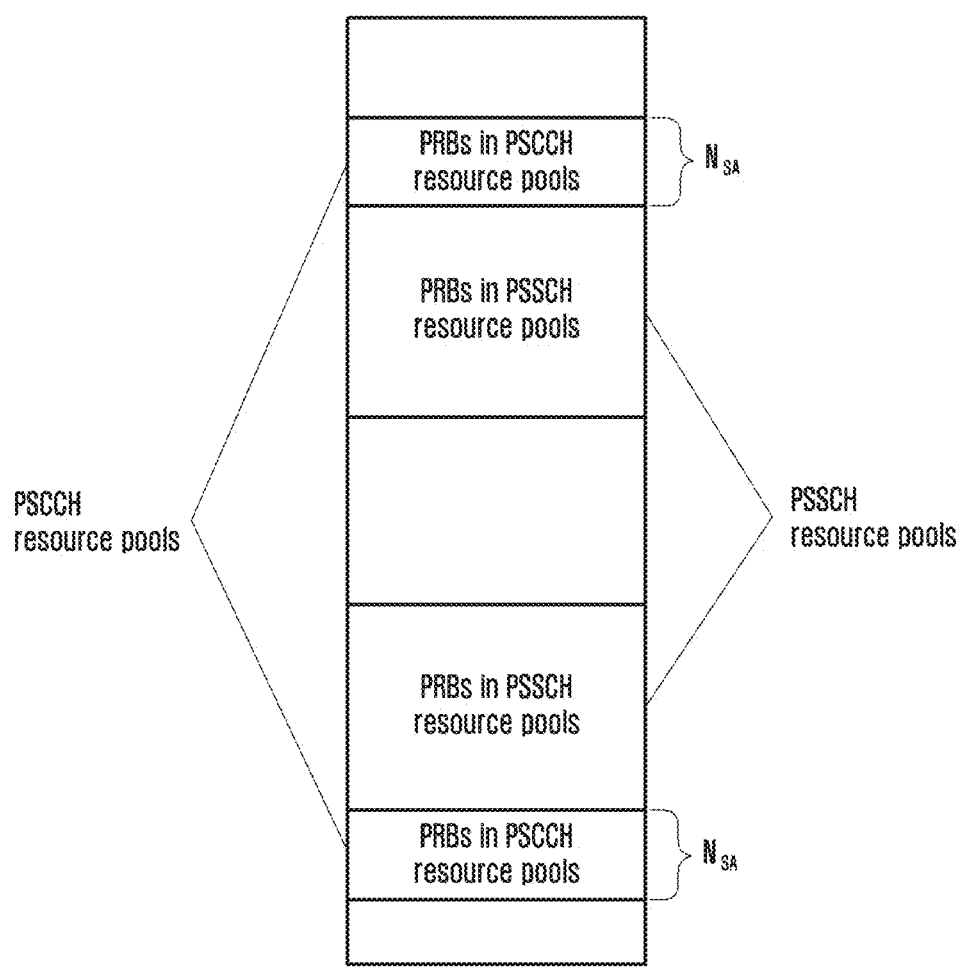
FIG. 6 is a schematic diagram of relative positions of set of PRBs in a PSCCH resource pool supporting transmission mode 1 and in an associated PSSCH resource pool according to the present application.

In this embodiment, there is a binding relationship between a multiple of PSCCH resource pools, and a multiple of PSCCH resources pools in a binding relationship are associated with a same PSSCH resource pool. The number of PSCCH resource pools in a binding relationship can be 2 or greater than 2. For each PSCCH resource pool and the associated PSSCH resource pool, if the transmission mode 1 is supported, and a set of subframes of the PSCCH resource pool is the same as that of the associated PSSCH resource pool and can be configured by the subframe set configuration method as described in the resource pool association mode 1 in Embodiment 4. PRBs contained in sets of PRBs of the two resource pools are continuous in the frequency domain, and the union set of the two sets of PRBs can contain two sections of continuous PRBs, where $N_{SA}$ (i.e., $N_{SA}$ at two ends) PRBs having the highest index value and $N_{SA}$ PRBs having the lowest index value belong to the PSCCH resource pool, where $N_{SA}$ is the number of PRBs for one SA transmission defined by the standard, for example, $N_{SA}=2$, as shown in FIG. 6.

If there is a binding relationship between a PSCCH resource pool C1 and another PSCCH resource pool C2, and the C2 and a PSSCH resource pool S2 associated with the C2 support transmission mode 1, a set of subframes of a PSSCH resource pool S1 associated with the C1 can be a union set of the set of subframes of the C1 and the set of subframes of the C2. And, a set of PRBs of the S1 should be a superset of a set of PRBs of the S2.

Step 620: By the UE, PSCCH resources required by one or multiple times of PSCCH transmission are determined in the corresponding PSCCH resource pools.

In this embodiment, the UE can select PSCCH resources from the PSCCH resource pools, according to the result of channel detection, or according to the positions of the selected PSSCH resources (this step should be prior to step 630 in this case), or randomly.

Step 630: By the UE, a time-frequency domain resource for PSSCH transmission is determined in the PSSCH resource pools associated with the PSCCH resource pools.

In this embodiment, a method for selecting PSSCH resources by the UE is the same as that in the step 530 in Embodiment 4.

Step 640: By the UE, a PSCCH and a PSSCH are transmitted on the determined resources.

If the current PSCCH and the associated PSSCH support transmission mode 1, the PSCCH should contain one or more of the following information fields:

1. the number $N_{PSSCH}$ of PRBs occupied by the scheduled PSSCH;
2. the modulation coding mode of the scheduled PSSCH;
3. an ID of a transmitting UE;
4. an index of a transmitting TB;
5. the number of times of transmission by the current TB; and
6. the priority of a service borne in the PSSCH.

If an index $i_{SA}$ of a PRB for transmitting the PSCCH is less than indexes of all PRBs in the PRB set of the associated PSSCH resource pool, indexes of $N_{PSSCH}$ PRBs for transmitting the scheduled PSSCH are $i_{SA}+1$, $i_{SA}+2$, . . . , $i_{SA}+N_{PSSCH}$, respectively. In contrast, if the index $i_{SA}$ of the PRB for transmitting the PSCCH is greater than indexes of all PRBs in the set of PRBs in the associated PSSCH resource pool, indexes of $N_{PSSCH}$ PRBs for transmitting the scheduled PSSCH are $i_{SA}-1$, $i_{SA}-2$, . . . , $i_{SA}-N_{PSSCH}$, respectively.

If the current PSCCH and the associated PSSCH support transmission mode 2, the PSCCH should contain one or more of the following information fields:

1. the position of a subframe of the scheduled PSSCH;
2. the position of a PRB occupied by the scheduled PSSCH;
3. the modulation coding mode of the scheduled PSSCH;
4. an ID of a transmitting UE;
5. an index of a transmitting TB;
6. the number of times of transmission by the current TB; and
the priority of a service borne in the PSSCH, Now, this embodiment ends. In this embodiment, if the PSCCH resource pool and the associated PSSCH resource pool support transmission mode 1, PRB(s) for transmitting the PSCCH and PRB(s) for transmitting the PSSCH are required to be continuous in the frequency domain, so that it is likely to result in the fragmentization of frequency-domain resources. By sharing PSSCH resource pools with the PSCCH resource pools supporting the transmission mode 2, this problem can be effectively avoided.

Figure 7:
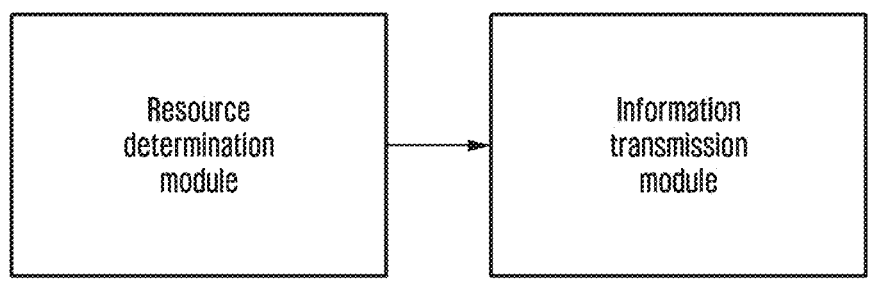
FIG. 7 is a schematic diagram of a composition structure of a preferred apparatus according to the present application.

The present application further provides an apparatus for transmitting a control channel and a data channel in V2X communication. The composition structure of the apparatus is as shown in FIG. 7, comprising: a resource determination module and an information transmission module, wherein:

the resource determination module is configured to determine a PSCCH transmission resource and an associated PSSCH transmission resource; and the information transmission module is configured to transmit corresponding information on the determined PSCCH transmission resource and PSSCH transmission resource.

It can be understood by a person of ordinary skill in the art that all of or a part of steps in the embodiment methods can be implemented by instructing related hardware by programs. The programs can be stored in a computer-readable storage medium, and, when executed, include one or a combination of the steps of the method embodiments.

In addition, each functional unit in each embodiment of the present application can be integrated into a processing module; or, each unit can exist alone physically; or, two or more units can be integrated into one module. The integrated module can be implemented in the form of hardware, or can be implemented in the form of a software functional module. If the integrated module is implemented in the form of a software functional module and sold or used as an independent product, the integrated module can also be stored in a computer-readable storage medium.

The storage medium can be a read-only memory, a magnetic disk, an optical disk, etc.

The forgoing description merely shows preferred embodiments of the present application and is not intended to limit the present application. Any modification, equivalent replacement or improvement made within the spirit and principle of the present application shall fall into the protection scope of the present application.

The invention claimed is:

1. A method performed by a terminal in vehicle to vehicle/pedestrian/infrastructure/network (V2X) communication, the method comprising:
   receiving, from a base station, information for a physical sidelink shared channel (PSSCH) resource pool;
   determining the PSSCH resource pool based on the information;
   determining a PSSCH resource among the PSSCH resource pool based on measurement on one or more PSSCH resources of the PSSCH resource pool;
   determining a physical sidelink control channel (PSCCH) resource based on the PSSCH resource, wherein the PSCCH resource is included in a subframe where the determined PSSCH resource exists; and
   transmitting a PSCCH on the determined PSCCH resource and a PSSCH on the determined PSSCH resource,
   wherein the information includes a bitmap associated with the PSSCH resource pool, and
   wherein the determining the PSSCH resource further comprises:
   excluding a candidate PSSCH resource from the PSSCH resource pool, in case that the candidate PSSCH resource overlaps with resource for other PSSCH transmission by other terminal.

2. The method of claim 1, wherein the information on the PSSCH resource pool is received in a system message.

3. The method of claim 1, wherein the PSCCH includes information on the PSSCH resource.

4. The method of claim 3, wherein the PSCCH further includes at least one of priority information of the PSSCH or information indicating whether the PSSCH is related to a retransmission.

5. The method of claim 1, wherein the bitmap is repeated within a system frame cycle.

6. The method of claim 1, wherein the information for the PSSCH resource pool comprises information for at least one PSSCH resource pool, and
wherein the determining the PSSCH resource pool comprises determining the PSSCH resource pool among the at least one PSSCH resource pool.

7. A terminal in vehicle to vehicle/pedestrian/infrastructure/network (V2X) communication, the terminal comprising:
a transceiver; and
a controller configured to:
receive, from a base station via the transceiver, information for a physical sidelink shared channel (PSSCH) resource pool,
determine the PSSCH resource pool based on the information,
determine a PSSCH resource among the PSSCH resource pool based on measurement on one or more PSSCH resources of the PSSCH resource pool,
determine a physical sidelink control channel (PSCCH) resource based on the PSSCH resource, wherein the PSCCH resource is included in a subframe where the determined PSSCH resource exists, and
transmit, via the transceiver, a PSCCH on the determined PSCCH resource and a PSSCH on the determined PSSCH resource,
wherein the information includes a bitmap associated with the PSSCH resource pool, and
wherein the controller is further configured to exclude a candidate PSSCH resource from the PSSCH resource pool, in case that the candidate PSSCH resource overlaps with resource for other PSSCH transmission by other terminal.

8. The terminal of claim 7, wherein the information on the PSSCH resource pool is received in a system message.

9. The terminal of claim 7, wherein the PSCCH includes information on the PSSCH resource.

10. The terminal of claim 9, wherein the PSCCH further includes at least one of priority information of the PSSCH or information indicating whether the PSSCH is related to a retransmission.

11. The terminal of claim 7, wherein the bitmap is repeated within a system frame cycle.

12. The terminal of claim 7, wherein the information for the PSSCH resource pool comprises information for at least one PSSCH resource pool, and
wherein the controller is configured to determine the PSSCH resource pool among the at least one PSSCH resource pool.

* * * * *